United States Patent
West

(10) Patent No.: US 8,310,105 B2
(45) Date of Patent: Nov. 13, 2012

(54) CENTRALIZED ISLANDING PROTECTION FOR DISTRIBUTED RENEWABLE ENERGY GENERATORS

(75) Inventor: Richard Travis West, Ragged Point, CA (US)

(73) Assignee: Renewable Power Conversion, Inc., San Luis Obispo, CA (US)

( * ) Notice: Subject to any disclaimer, the term of this patent is extended or adjusted under 35 U.S.C. 154(b) by 0 days.

(21) Appl. No.: 13/221,835

(22) Filed: Aug. 30, 2011

(65) Prior Publication Data

US 2011/0309690 A1 Dec. 22, 2011

(51) Int. Cl.
*H02J 1/00* (2006.01)
*H02J 3/00* (2006.01)

(52) U.S. Cl. ......................................... 307/87

(58) Field of Classification Search .............. 307/80, 307/82, 85, 87
See application file for complete search history.

(56) References Cited

U.S. PATENT DOCUMENTS

| | | | | |
|---|---|---|---|---|
| 6,603,290 B2* | 8/2003 | Hochgraf | .................... | 322/37 |
| 7,304,403 B2* | 12/2007 | Xu | .................... | 307/84 |
| 2007/0114978 A1* | 5/2007 | Lindahl et al. | .............. | 323/207 |
| 2009/0059631 A1* | 3/2009 | Krein | .............. | 363/95 |
| 2011/0115301 A1* | 5/2011 | Bhavaraju et al. | .............. | 307/86 |

* cited by examiner

*Primary Examiner* — Carlos Amaya

(57) ABSTRACT

A device and method is disclosed for providing electrical grid-tied power converter anti-islanding protection, which is autonomous to the operation of the power converter. The device can protect any number of paralleled power converters and can independently detect an islanding condition. The method involves actively perturbing the electrical grid at a common point of coupling between converter and grid, observing the effect of the perturbation, comparing the perturbed and non-perturbed grid characteristics and disconnecting the converter from the grid if an island is indicated. Perturbation is accomplished by switching a reactive load or loads onto the grid or by changing a transformer tap.

The invention is targeted for solar photovoltaic applications where a number of distributed power converters are used. The invention eliminates the interaction of anti-islanding algorithms between multiple power converters, determines islanding conditions with a greater degree of certainty and reduces current distortion over prior-art anti-islanding methods.

13 Claims, 3 Drawing Sheets

CENTRALIZED ISLANDING PROTECTION FOR DISTRIBUTED RENEWABLE ENERGY GENERATORS

BACKGROUND OF THE INVENTION

All regulatory-code-compliant, utility-grid-interactive power converters must operate according to grid-connect standards for a given jurisdiction. In the United States, the governing standard is IEEE Standard for Interconnecting Distributed Resources with Electric Power Systems, commonly known as IEEE 1547. In short, this standard specifies that distributed resources, such a solar photovoltaic power converters, must provide a minimum power quality, must not operate outside of set utility voltage and frequency limits and must detect an islanding condition and automatically cease power production.

Islanding or run-on is an abnormal operating condition where a grid-interactive power converter continues to supply power to grid-connected loads following the loss of the utility grid source. In simple terms, all grid-interactive power converters are current sources, whereas the grid source, typically the electric utility grid, is a voltage source. The power converters, the grid source and grid-connected loads are connected at a point commonly referred to as the point of common coupling (PCC). All anti-islanding detection algorithms use passive and active methods. The passive method involves monitoring the voltage and frequency at the PCC and checking for voltages or frequencies outside of specified limits. The passive method alone will not detect an island under balanced conditions where available power out of the converter matches the power into grid-connected loads. All active methods assume a worst-case balanced condition and periodically and purposefully attempt to disturb a balanced condition to force the voltage or frequency at the PCC past passive detection trip points. Almost all prior art disturbance methods are integrated with the power converter control systems and work by periodically jogging the amplitude or phase of the power converter sinusoidal current references to force a detectable change at the PCC. If the grid voltage source is present, purposefully jogging or distorting the power converter output current will not affect the voltage or frequency at the PCC. If however, the grid voltage source is lost, and therefore is not controlling the voltage at the PCC, then sufficient changes in power converter current can result in detectable changes in voltage or frequency across the grid-connected loads. IEEE 1547 requires that an island condition be detected and that the power converter either be shutdown or disconnected from the PCC within two seconds after formation of an island. As such, under all conditions where the power converter is sourcing power at the PCC, the power converter current is typically shifted in phase or amplitude for at least one cycle every second to "test" for an island.

Prior art approaches to anti-islanding protection have a number of basic limitations. (i) Distortion—Ideally, the power converter would source perfect, low-harmonic-distortion sinewave currents into the grid voltage source at the PCC. Prior art methods rely on purposefully distorting the converter output current, typically for at least one cycle every second, as part of the island detection algorithm. (ii) Interaction—When multiple power converters are connected at the PCC, interactions between individual power converter anti-islanding algorithms may cause nuisance tripping or in the other extreme may cause an island to go undetected. (iii) Non Autonomous Operation—Almost all prior art methods use the power converter control as an integral part of the anti-islanding algorithm. (iv) Absolute Trip Levels—The magnitude of grid disturbance required with prior art methods must be great enough force the grid past absolute under/over, voltage/frequency trip points. (v) Cost—In prior art systems with a large number of distributed DC-to-AC power converters, each inverter is required to have an integrated anti-islanding protection system.

BRIEF SUMMARY OF THE INVENTION

A device and method is disclosed for providing anti-islanding protection for an electrical grid-tied power converter, which is autonomous to the operation of the power converter. The device can protect any number of paralleled power converters and can independently determine if an islanding condition exists. The method involves actively perturbing the electrical grid at a common point of coupling between converter and grid, observing the effect of the perturbation, comparing the perturbed and non-perturbed grid characteristics and disconnecting the converter from the grid if a run-on or islanding condition is indicated. Perturbation is accomplished switching a reactive load or loads onto the grid or by changing a transformer tap connection at the point of common coupling.

The invention is targeted for use in solar photovoltaic power plants which have a number of distributed DC-to-AC power converters. The invention eliminates the interaction of anti-islanding algorithms between multiple power converters, determines islanding conditions with a greater degree of certainty, reduces current distortion over prior art anti-islanding methods and provides a least-cost anti-islanding solution for systems with distributed power converters.

DETAILED DESCRIPTION OF THE INVENTION

Figure 1:
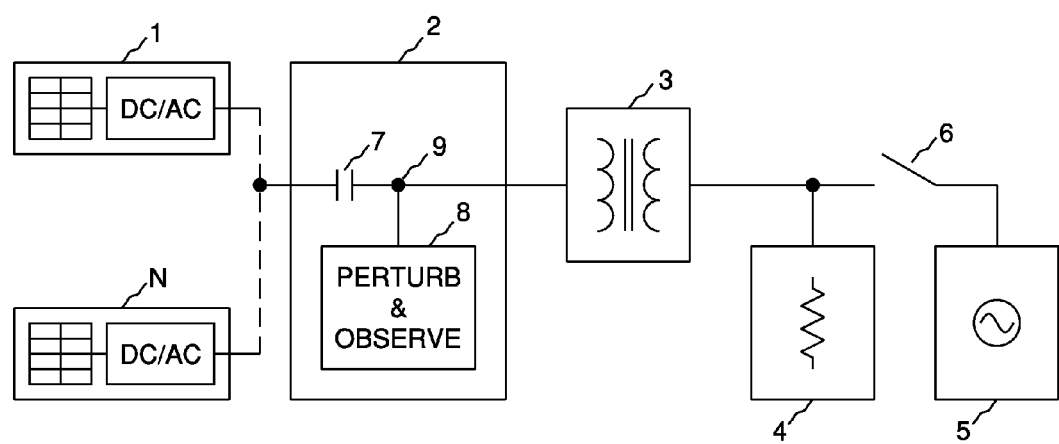
FIG. 1 illustrates an application of the invention as a protective anti-islanding device in a grid-interactive power system.

FIG. 1 shows how the invention is applied in a system. The system comprises a number of distributed photovoltaic power sources each with dedicated DC-to-AC power converters, 1 through N, protective anti-islanding device (the invention) 2, distribution transformer 3, grid-connected loads 4, AC grid source 5 and switch 6. The invention further comprises isolation contactor 7 and perturb and observe circuit block 8. Under normal operating conditions, isolation contactor 7 and switch 6 are closed and the net power transfer into grid source 5 is the combined output of DC to AC power converters, 1 through N, less the power consumed by grid-connected loads 4. An islanding fault condition is established when switch 6 is opened (functionally representing the loss grid source 5) and the power available from photovoltaic-to-AC power converters, 1 through N, matches the power consumed by grid-connected loads 4. An island or run-on condition may exist indefinitely as long as this source and load balance is maintained. The perturb and observe circuit block 8 periodically attempts to disturb the voltage, phase, frequency or power transfer at the point of common coupling 9, observes the effect of the perturbation, compares perturbed and non-perturbed grid characteristics and disconnects the converter, by opening contactor 7 if a run-on or island condition is indicated. Perturbation is accomplished by switching a reactive load or loads onto the grid, by changing a transformer tap connection or by shorting a number of transformer winding turns at the point of common coupling 9.

Figure 2:
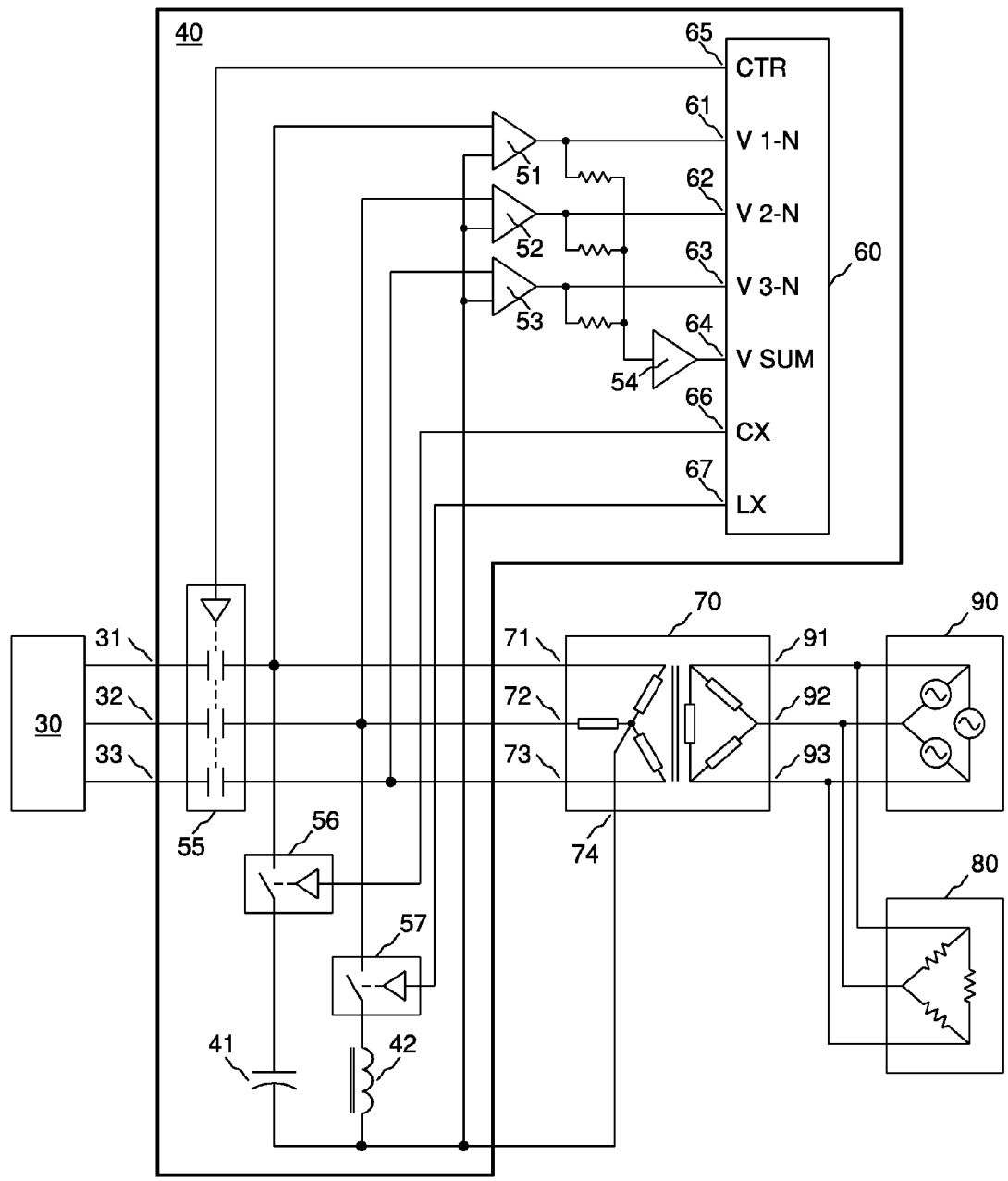
FIG. 2 illustrates the preferred embodiment of the invention where, in order to perturb the system, reactive loads are periodically switched onto the point of common coupling between a power converter, an electric utility grid source and grid-connected loads.

FIG. 2 illustrates the preferred embodiment of the invention where, in order to perturb the system, reactive loads 41 and 42 are periodically switched onto the point of common coupling (with respect to power transfer) between power converter 30, electric utility grid source 90 and grid-connected loads 80. In this embodiment, the invention is protective device 40 and comprises all the elements circumscribed by the illustrated boundary line. The input connections of device 40 and the output connections of power converter 30 are designated as terminals 31, 32 and 33. Power converter 30 may be one power converter or many power converters connected in parallel, all regulating 3-phase current. When isolation contactor 55 is closed, this 3-phase current is sourced into the low voltage terminals 71, 72 and 73 of distribution transformer 70 and in turn is sourced from high voltage terminals 91, 92 and 93 of distribution transformer 70 into utility grid voltage source 90. The aggregate power converter 3-phase output current is synchronized with the 3-phase utility source voltage to enable power transfer into utility source 90. Grid-connected loads 80 are shown across terminals 91, 92 and 93. An island is formed when utility source 90 is lost and power is only supplied from power converter 30 to loads 80.

In FIG. 2, during normal operation of the system, isolation contactor 55 is closed, control circuit 60 periodically issues commands 66 and 67 to close switches 56 and 57 respectively. When switch 56 is closed, capacitive load 41 is connected across terminals 71 and 74, low voltage line 1-to-neutral. When switch 57 is closed, inductive load 42 is connected across terminals 72 and 74, low voltage line 2-to-neutral. Differential voltage sensors 51, 52 and 53 sense low voltage line 1, 2 and 3 voltages, respectively, all with respect to neutral and provide analog input signals 61, 62 and 63, respectively, for control circuit 60. Summing amplifier 54 adds signals 61, 62 and 63 and supplies the result as signal 64 for control circuit 60. With switches 56 and 57 open and with a perfect 3-phase voltage balance on terminals 71, 72 and 73, signal 64 will be zero. In a typical system, signal 64 will indicate some baseline level of imbalance. Control circuit 60 reads signal 64 for a number of line-frequency cycles and stores averaged values, peak values, waveforms, phase shift and/or frequency data which characterize the non-perturbed grid. When either switch 56 or 57 is closed or both are closed, signals 61, 62, 63 and 64 are read (observed) and this perturbed grid data is compared to the non-perturbed baseline data to determine if an island exists. By way of example, an average baseline RMS value of signal 64 is calculated and stored, switches 56 and 57 are closed and the RMS value signal 64 is again read and compared with the stored baseline value, the addition of capacitive load 41 and inductive load 42, imbalance the system and therefore cause the RMS value of signal 64 to increase. If this increase is above a predetermined trip point, then an island is indicated. By way of a second example, the time difference between a non-perturbed voltage zero crossing of a given phase-to-phase or phase-to-neutral voltage is compared with that of a perturbed zero-voltage crossing. If a phase relationship is significantly changed, then an island is indicated. In practice, a number different data comparisons will be made to conclusively detect an island. Reactive loads are used as opposed to resistive loads so that power is not dissipated in the perturbation process. Also, if capacitive load 41 and inductive load 42 have equal but opposite reactive impedances, then net system power factor is maintained. Power quality is also maintained by timing the open and close transitions of switch 56 with line 1-to-neutral voltage zero crossings and in a similar way by synchronizing the transitions of switch 57 with line 2 zero-current crossings. In practice switches 56 and 57 may be bi-directional blocking semiconductor devices, such as back-to-back (emitter-to-emitter or collector-to-collector) insulated gate bipolar transistors.

Figure 3:
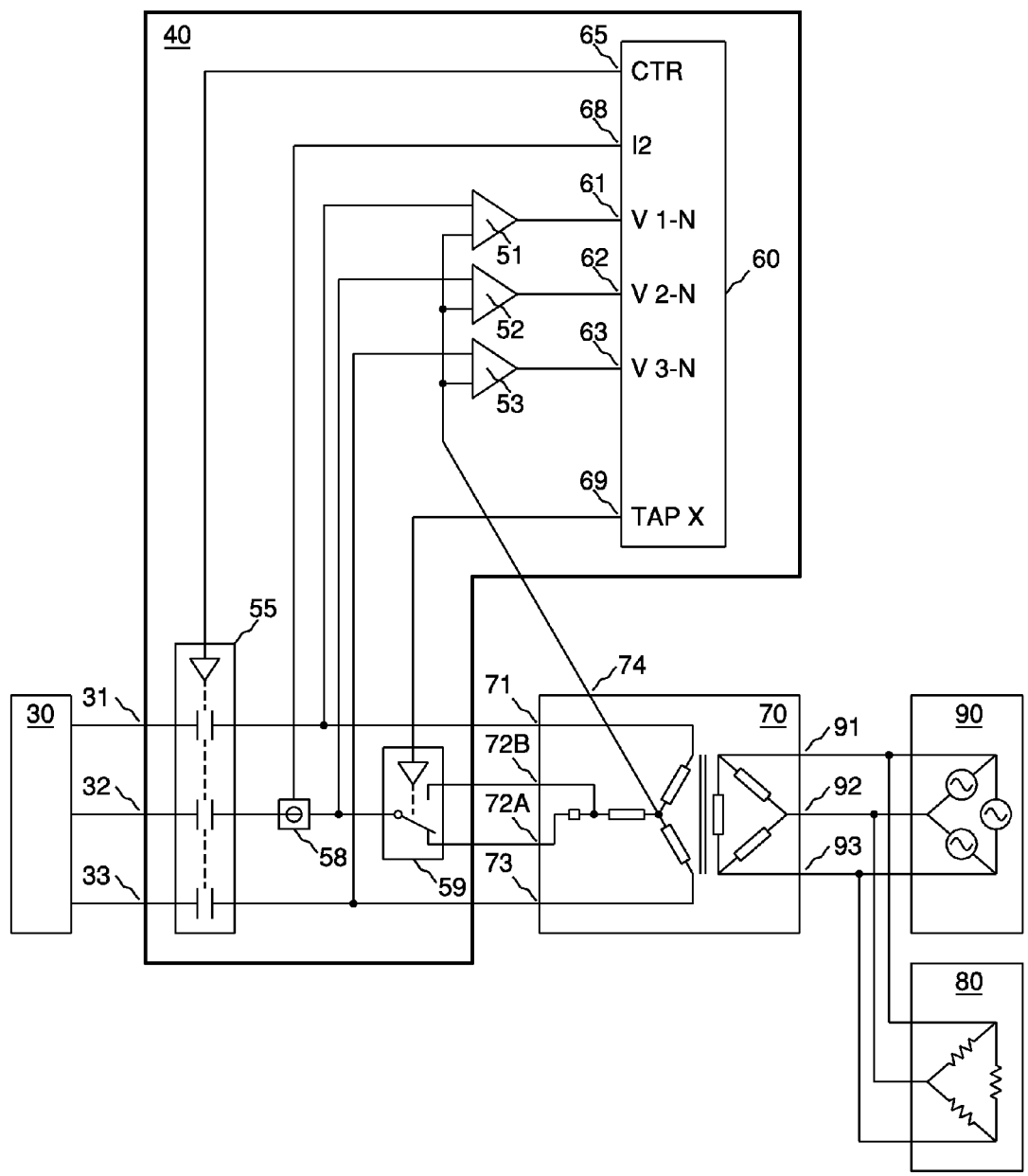
FIG. 3 illustrates a second embodiment of the invention where, in order to perturb the system, a transformer tap is periodically switched at the point of common coupling between a power converter, an electric utility grid source and grid-connected loads.

FIG. 3 illustrates a second embodiment of the invention where, in order to perturb the system, a transformer tap is periodically switched at the point of common coupling (with respect to power transfer) between power converter 30, electric utility grid source 90 and grid-connected loads 80. In this embodiment, the invention is protective device 40 and comprises all the elements circumscribed by the illustrated boundary line. The input connections of device 40 and the output connections of power converter 30 are designated as terminals 31, 32 and 33. Power converter 30 may be one power converter or many power converters connected in parallel, all regulating 3-phase current. When isolation contactor 55 is closed, this 3-phase current is sourced into the low voltage terminals 71, 72 and 73 of distribution transformer 70 and in turn is sourced from high voltage terminals 91, 92 and 93 of distribution transformer 70 into utility grid voltage source 90. The aggregate power converter 3-phase output current is synchronized with the 3-phase utility source voltage to enable power transfer into utility source 90. Grid-connected loads 80 are shown across terminals 91, 92 and 93. An island is formed when utility source 90 is lost and power is only supplied from power converter 30 to loads 80.

In FIG. 3, during normal operation of the system, isolation contactor 55 is closed, control circuit 60 periodically issues command 69 to change a voltage tap from terminal 72A to 72B to perturb the system. Differential voltage sensors 51, 52 and 53 sense low voltage line 1, 2 and 3 voltages, respectively, all with respect to neutral and provide analog signals 61, 62 and 63 respectively for control circuit 60. Current sensor 58 reads line 2 current and provides analog signal 68 for control circuit 60. Control circuit 60 reads signals 61, 62, 63 and 68 for a number of line-frequency cycles and stores averaged values, peak values, waveforms, phase shift and/or frequency data which characterize the non-perturbed grid. When command 69 is given to change the tap switch, the terminal 32 circuit changes from terminal 72A, the balanced tap, to terminal 72B and signals 61, 62, 63 and 68 are read (observed) and this perturbed grid data is compared to the non-perturbed baseline data. If grid 90 is present and an island does not exist, the line 2-to-neutral voltage and the power into line 2 will be reduced by the turns ratio of the tap change. In addition, the voltage at transformer neutral point 74, calculated by control circuit as the sum of signals 61, 62 and 63, will become imbalanced by a known amount. If an island does exist, the line 2-to-neutral voltage will be the reflected voltage of the current through load 80 rescaled by the perturbed turns ration and the delta-to-wye transform. With power converter 30 sourcing an island, the line 2-to-neutral voltage and the power into line 2 will be reduced by an amount approximately twice that of power converter 30 sourcing grid 90. During the short perturbation period, the power converter current is constant because the change in energy out of the power converter is small compared with the DC buss energy storage of any known power converter topology. Power quality is maintained by timing the open and close transitions of switch 59 with line 2 current zero crossings. In practice, switch 59 may use bi-directional blocking semiconductor devices, such as back-to-back (emitter-to-emitter or collector-to-collector) insulated gate bipolar transistors to configure the single-pole-double-throw switch 59.

In FIG. 3 one method is disclosed to perturb the system by using a transformer tap change. Other methods may include, providing a single-pole-three-throw switch function with nominal+, nominal and nominal-voltage taps, so that perturbation events would alternate between momentarily increasing power and decreasing power. Another method may include a multi-tier perturbation where the power is perturbed by successively large power change increments if island detection is indeterminate after testing with smaller incremental power changes. Another method may include tap change capability on all three phases, used in rotation to force a higher or lower frequency or relative phase shift at the point of common coupling. Another method may include, a controllable switch to momentarily open one low-voltage winding of a delta-configured transformer. Another method may include a controllable switch used to short-circuit a small number of turns on a low-voltage transformer winding. All methods in this paragraph are considered novel and are part of the invention.

The invention is targeted for use in solar photovoltaic power plants which have a number of distributed DC-to-AC power converters. The invention eliminates the interaction of anti-islanding algorithms between multiple power converters, determines islanding conditions with a greater degree of certainty by using adaptive and relative as well as absolute trip points, reduces current distortion over prior art anti-islanding methods and provides a least-cost anti-islanding solution for systems with distributed power converters.

What I claim as my invention is:

1. A protective, anti-islanding device for use with one or more electrical grid-interactive generators and comprising; (i) a means of periodically perturbing or attempting to disturb the stability, balance, voltage, frequency or line-to-line phase-relationships of an electrical grid at a point of common coupling, with respect to power transfer between a grid-interactive generator, an electrical grid source and a grid-connected load, (ii) a means of observing an effect of said perturbing or attempting to disturb stability, balance, voltage, frequency or line-to-line phase-relationships of said electrical grid, (iii) a means of determining if said effect of perturbing or attempting to disturb said stability, balance, voltage, frequency or line-to-line phase-relationships of said electrical grid is characteristic of and therefore indicates an islanding condition or more succinctly, if said effect of perturbing or attempting to disturb said stability, balance, voltage, frequency or line-to-line phase-relationships of said electrical grid indicates that the electrical grid-interactive generator is supplying the grid-connected load in the absence of the electrical grid source, and (iv) a means of disconnecting the electrical grid-interactive generator from said point of common coupling or a means of shutting down the electrical grid-interactive generator if an islanding condition is determined and where said means of perturbing or attempting to disturb said stability, balance, voltage, frequency or line-to-line phase-relationships of the electrical grid further comprises a controllable switch, a reactive load in series with the switch, and a control circuit where said control circuit further comprises a means of periodically issuing commands to close said switch to couple said reactive load at said point of common coupling for some period of time.

2. The protective anti-islanding device for use with one or more electrical grid-interactive generators according to claim 1 where said means of perturbing or attempting to disturb the stability, balance, voltage, frequency or line-to-line phase-relationships of an electrical grid comprises; controllable switches, reactive loads in series with each switch, and a control circuit where said control circuit further comprises a means of periodically issuing commands to selectively close said switches to connect said reactive loads to said point of common coupling for some period of time and where said reactive loads further comprise both inductive and capacitive loads which minimize changes in net power factor.

3. The protective anti-islanding device for use with one or more electrical grid-interactive generators according to claim 1 where said means of periodically perturbing or attempting to disturb the stability, balance, voltage, frequency or line-to-line phase-relationships of an electrical grid comprises a switching apparatus and a means for synchronizing the open/close, close/open, conduction/non-conduction or non-conduction/conduction transitions of said switching apparatus with a voltage zero crossing or current zero crossing at said point of common coupling.

4. The protective anti-islanding device for use with one or more electrical grid-interactive generators according to claim 3 where said switching apparatus further comprises a bi-directional semiconductor based switching element, an electromechanical switching element or a hybrid semiconductor assisted electromechanical switching element.

5. The protective anti-islanding device for use with one or more electrical grid-interactive generators according to claim 1 where said means of determining if said effect of perturbing or attempting to disturb said stability, balance, voltage, frequency or line-to-line phase-relationships of an electrical grid is characteristic of and therefore indicates an islanding condition comprises any combination of voltage, current, frequency and/or phase shift sensors monitoring the electrical grid.

6. The protective anti-islanding device for use with one or more electrical grid-interactive generators according to claim 1 where said means of determining if said effect of perturbing or attempting to disturb said stability, balance, voltage, frequency or line-to-line phase-relationships of an electrical grid is characteristic of and therefore indicates an islanding condition comprises a means of sampling and storing electrical grid baseline voltage, current, frequency, imbalance and/or phase angle data during a time period when the electrical grid is not being intentionally perturbed, a means of sampling the same type data during an intentional perturbation time period and a means of comparing the two sampled data sets with respect to predefined differences that would indicate an islanding condition.

7. A protective, anti-islanding device for use with one or more electrical grid-interactive generators and comprising; (i) a means of periodically perturbing or attempting to disturb the stability, balance, voltage, frequency or line-to-line phase-relationships of an electrical grid at a point of common coupling with respect to power transfer between a grid-interactive generator, an electrical grid source and a grid-connected load, (ii) a means of observing an effect of said perturbing or attempting to disturb stability, balance, voltage, frequency or line-to-line phase-relationships of said electrical grid, (iii) a means of determining if said effect of perturbing or attempting to disturb said stability, balance, voltage, frequency or line-to-line phase-relationships of said electrical grid is characteristic of and therefore indicates an islanding condition or more succinctly, if said effect of perturbing or attempting to disturb said stability, balance, voltage, frequency or line-to-line phase-relationships of said electrical grid indicates that the electrical grid-interactive generator is supplying the grid-connected load in the absence of the electrical grid source, and (iv) a means of disconnecting the electrical grid-interactive generator from said point of common coupling or a means of shutting down the electrical grid-interactive generator if an islanding condition is determined and where said means of perturbing or attempting to disturb said stability, balance, voltage, frequency or line-to-line phase-relationships of the electrical grid further comprises; a controllable switching apparatus capable of changing a tap setting or settings on a connected transformer and a control circuit where said control circuit further comprises a means of periodically issuing commands to said controllable switching apparatus to change a tap setting or settings on a transformer winding or windings.

8. The protective anti-islanding device for use with one or more electrical grid-interactive generators according to claim 7 where said means of perturbing or attempting to disturb the stability, balance, voltage, frequency or line-to-line phase-relationships of an electrical grid comprises a means of selectively and periodically short circuiting a portion of a transformer winding.

9. The protective anti-islanding device for use with one or more electrical grid-interactive generators according to claim 7 where said means of perturbing or attempting to disturb the stability, balance, voltage, frequency or line-to-line phase-relationships of an electrical grid comprises a means of selectively and periodically opening a portion of a transformer winding.

10. The protective anti-islanding device for use with one or more electrical grid-interactive generators according to claim 7 where said means of periodically perturbing or attempting to disturb the stability, balance, voltage, frequency or line-to-line phase-relationships of an electrical grid comprises a switching apparatus and a means for synchronizing the open/close, close/open, conduction/non-conduction or non-conduction/conduction transitions of said switching apparatus a voltage zero crossing or current zero crossing at said point of common coupling.

11. The protective anti-islanding device for use with one or more electrical grid-interactive generators according to claim 7 where said means of determining if said effect of perturbing or attempting to disturb said stability, balance, voltage, frequency or line-to-line phase-relationships of an electrical grid is characteristic of and therefore indicates an islanding condition comprises any combination of voltage, current, frequency and/or phase shift sensors monitoring the electrical grid.

12. The protective anti-islanding device for use with one or more electrical grid-interactive generators according to claim 7 where said means of determining if said effect of perturbing or attempting to disturb said stability, balance, voltage, frequency or line-to-line phase-relationships of an electrical grid is characteristic of and therefore indicates an islanding condition comprises a means of sampling and storing electrical grid baseline voltage, current, frequency, imbalance and/or phase angle data during a time period when the electrical grid is not being intentionally perturbed, a means of sampling the same type data during an intentional perturbation time period and a means of comparing the two sampled data sets with respect to predefined differences that would indicate an islanding condition.

13. A method of providing autonomous anti-island protection for electrical grid-interactive power converters or inverters where said power converters or inverters are coupled to an electrical grid source and an electrical grid load at a point of common coupling, with respect to power transfer, and where said point of common coupling, is periodically and purposefully perturbed in order to affect a change in a voltage, a frequency, a current or a phase angle at the point-of-common coupling and where said change in a voltage, a frequency, a current or a phase angle is observed and compared to predefined limits to determine if said change in a voltage, a frequency, a current or a phase angle is characteristic of a response indicating a loss of the electrical grid source and furthermore where this anti-islanding protection method is autonomous to the operation of either the power converters or the inverters and furthermore where the method of periodically and purposefully perturbing is to either selectively couple a reactive load or loads at the point of common coupling or to change a tap setting or settings on a transformer winding or windings.

* * * * *